United States Patent
Chen et al.

(10) Patent No.: US 8,653,736 B2
(45) Date of Patent: Feb. 18, 2014

(54) MULTIPLE CHANNEL LIGHT SOURCE POWER SUPPLY WITH OUTPUT PROTECTION

(75) Inventors: Keng Chen, North Andover, MA (US); Christian Breuer, Newburyport, MA (US); Peng Xiao, Quincy, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 147 days.

(21) Appl. No.: 13/404,415

(22) Filed: Feb. 24, 2012

(65) Prior Publication Data

US 2012/0313528 A1 Dec. 13, 2012

Related U.S. Application Data

(60) Provisional application No. 61/495,291, filed on Jun. 9, 2011, provisional application No. 61/537,562, filed on Sep. 21, 2011.

(51) Int. Cl.
*H05B 37/00* (2006.01)

(52) U.S. Cl.
USPC ............ 315/121; 315/186; 315/297; 315/313

(58) Field of Classification Search
USPC ................ 315/121–123, 291, 294–295, 297, 315/299–302, 307–308, 312, 313, 185 R, 315/186, 193–195
See application file for complete search history.

(56) References Cited

U.S. PATENT DOCUMENTS

| | | | | |
|---|---|---|---|---|
| 6,798,152 | B2 * | 9/2004 | Rooke et al. | 315/209 R |
| 7,420,335 | B2 * | 9/2008 | Robinson et al. | 315/224 |
| 7,919,925 | B2 * | 4/2011 | Ito et al. | 315/82 |
| 8,248,114 | B2 * | 8/2012 | Russell et al. | 327/108 |
| 2009/0009088 | A1 | 1/2009 | Ito et al. | |

FOREIGN PATENT DOCUMENTS

DE 10 2009 027326 A1 7/2010
WO 2009/151743 A2 12/2009

OTHER PUBLICATIONS

M. Burchielli, Communication of Extended European Search Report for Application No. 12170919.0-2206, Oct. 5, 2012, pp. 1-7, European Patent Office, Munich, Germany.

* cited by examiner

*Primary Examiner* — James H Cho
(74) *Attorney, Agent, or Firm* — Shawn P. Montana

(57) ABSTRACT

Multiple output channel light source power supply circuits, and methods for protecting the output channels, are provided. A front end circuit receivess an input voltage and provides a regulated front end DC voltage. A plurality of voltage converter circuits are each configured to receive the regulated front end DC voltage and provide a separate associated DC output for an associated one of the multiple output channels. A protection switch is coupled therebetween, and includes a conducting state, to couple the front end DC voltage to the plurality of voltage converter circuits, and a non-conducting state, to decouple the front end DC voltage. A current sense circuit is coupled to the voltage converter circuits, and provides a current sense output representative of current through at least one voltage converter circuit. A controller circuit places the protection switch in the non-conducting state in response to the current sense output.

12 Claims, 4 Drawing Sheets

MULTIPLE CHANNEL LIGHT SOURCE POWER SUPPLY WITH OUTPUT PROTECTION

CROSS-REFERENCE TO RELATED APPLICATIONS

The present application claims priority of U.S. Provisional Application No. 61/495,291, entitled "OUTPUT PROTECTION CIRCUIT FOR MULTI-CHANNEL HIGH WATTAGE POWER SUPPLY" and filed Jun. 9, 2011, and U.S. Provisional Application No. 61/537,562, entitled "MULTI-CHANNEL POWER PROTECTION MOSFET SWITCH" and filed Sep. 21, 2011, the entire contents of both of which are hereby incorporated by reference.

TECHNICAL FIELD

The present invention relates to lighting, and more specifically, to power supplies for lighting.

BACKGROUND

Certain power supplies used in the United States are subject to the safety regulations established by the Underwriters Laboratory, particularly the UL1310 Class 2 standard. The UL1310 standard limits the voltage, current, and power of each output of power supplies classified as Class 2 supplies. These limits must be met even under single component fault conditions. The power limit on a UL1310 Class 2 power supply, for example, is currently 100 Watts per output channel. Each channel/output of a power supply may be configured to drive a separate light source, e.g. a solid state light source (i.e., light-emitting diode (LED), organic light emitting diode (OLED), etc.), a gas-discharge lamp, or an incandescent lamp, among others.

Such power supplies often utilize two voltage conversion stages, i.e. a front end stage and an output stage. The front end stage may receive an input voltage, e.g. a 120 VAC voltage, and convert the input voltage to a regulated DC output voltage. The output stage may receive the DC output of the front end stage and provide a regulated DC output using a DC/DC converter for each channel of the power supply. Each of the stages is thus capable of limiting the output voltage, current, and power.

SUMMARY

With a single channel power supply, the power limit of both the front end stage and the output stage may be set to less than 100 Watts, so that the stages serve as backups to each other. In a multiple channel/output power supply, each of the output channels, when combined, may be capable of delivering more than 100 Watts. Therefore, the output power limit of the front end stage in a multiple channel power supply may need to be set at higher than 100 Watts, and cannot serve to backup a potential single component fault in a single channel of the output stage.

Perhaps the highest impact fault that may occur in a multiple channel/output power supply is when the regulation of one or more of the outputs is shorted (e.g., a MOSFET or inductor short of an output buck regulator), which may result in the faulty output delivering the maximum front end power on that single faulty channel. This is not likely an issue on a single channel/output power supply if the power limit of the front end is less than the 100 Watts maximum limit for the output per UL1310. However, this can be a significant issue when the faulty channel is in a multiple channel/output power supply, because the power limit for the front end is likely higher than 100 Watts.

In some known configurations, the potential for a single faulty output channel delivering more than 100 Watts is addressed by providing additional protection circuitry on each output channel. The protection circuitry may monitor the voltage and current for each output channel, and may turn off the channel and/or the entire power supply if one of the values representing the voltage, current, or power is too high. The additional protection circuitry, however, requires more components and more space, adding both additional monetary and efficiency costs. Alternatively, of course, a power supply could simply offer no more than 100 Watts combined across all of its channels.

Embodiments of the present invention provide a power supply with a protection circuit between a front end stage and an output stage, where the output stage includes a plurality of voltage converter circuits. Each of the voltage converter circuits provides a separate associated output to each output channel of the power supply. A current sense circuit is coupled to the voltage converter circuits and provides a current sense output to a controller circuit. When the current through one or more of the voltage converter circuits exceeds a pre-determined value as represented by the current sense output, the controller circuit provides an output to a protection switch for decoupling the output of the frond end stage from the voltage converter circuits. According, if there is a short circuit or other fault in any of the voltage converter circuits of the output stage, all of the voltage converter circuits of the output stage are effectively turned "off" to avoid excessive power (e.g., power greater than 100 Watts) on any of the output power supply channels.

Embodiments of such a power supply circuit thus provide output protection for a multiple channel power supply without requiring additional circuitry on each channel of the power supply. This provides size, cost, reliability, and efficiency advantages. In addition, embodiments may include a current sense circuit that provides a current sense output that is a voltage output, thus providing very little additional energy losses as a result of the current sense circuit. Also, when the voltage converter circuits are decoupled from the front end stage by the protection switch, the front end stage may enter a standby mode, keeping the power consumption of the power supply low.

In an embodiment, there is provided a light source power supply circuit having multiple output channels. The light source power supply circuit includes: a front end circuit configured to receive an input voltage and provide a regulated front end direct current (DC) voltage; a plurality of voltage converter circuits, each of the voltage converter circuits in the plurality of voltage converter circuits being configured to receive the regulated front end DC voltage and provide a separate associated DC output for an associated one of the multiple output channels; a protection switch coupled between the plurality of voltage converter circuits and the front end circuit, the protection switch having a conducting state to couple the front end DC voltage to the plurality of voltage converter circuits and a non-conducting state to decouple the front end DC voltage from the plurality of voltage converter circuits; a current sense circuit coupled to the plurality of voltage converter circuits, the current sense circuit being configured to provide a current sense output representative of current through at least one of the voltage converter circuits in the plurality of voltage converter circuits;

and a controller circuit configured to place the protection switch in the non-conducting state in response to the current sense output.

In a related embodiment, the plurality of voltage converter circuits may include a plurality of switches, and the controller circuit may be configured to provide an output to place a switch in the plurality of switches in a non-conducing state so that power is not delivered by the switch in the plurality of switches to a light source connected to an output channel of the light source power supply circuit associated with that switch.

In another related embodiment, the protection switch may be coupled between a low side output of the front end circuit and the plurality of voltage converter circuits. In a further related embodiment, the plurality of voltage converter circuits may be a plurality of switching converter circuits, and the current sense circuit may include at least one resistor, the at least one resistor being coupled to each of the switching converter circuits in the plurality of switching converter circuits to sense current through the plurality of switching converter circuits, and the current sense output may include a voltage across the at least one resistor. In a further related embodiment, the protection switch may include a transistor having a gate coupled to the controller, a source coupled to the at least one resistor, and a drain coupled to each of the switching converter circuits in the plurality of switching converter circuits. In a further related embodiment, the drain may be coupled to a switch portion of each switching converter circuit in the plurality of switching converter circuits through a resistor.

In yet another related embodiment, the protection switch may be coupled between a high side output of the front end circuit and the plurality of voltage converter circuits. In a further related embodiment, the current sense circuit may include at least one resistor coupled between a low side output of the front end circuit and ground, and the current sense output may include a voltage across the at least one resistor.

In still another related embodiment, each of the voltage converter circuits in the plurality of voltage converter circuits may be configured as a buck converter.

In another embodiment, there is provided a multiple output channel light source power supply circuit. The multiple output channel light source power supply circuit includes: a front end circuit configured to receive an input voltage and provide a regulated front end direct current (DC) voltage; a plurality of voltage converter circuits, each of the voltage converter circuits being configured as a buck converter and configured to receive the regulated front end DC voltage and provide a separate associated DC output for an associated one of the multiple output channels; a protection switch coupled between the plurality of voltage converter circuits and a low side output of the front end circuit, the protection switch having a conducting state to couple the front end DC voltage to the plurality of voltage converter circuits and a non-conducting state to decouple the front end DC voltage from the plurality of voltage converter circuits; a current sense circuit coupled to the plurality of voltage converter circuits, the current sense circuit configured to provide a current sense output representative of current through at least one of the voltage converter circuits; and a controller circuit configured to provide an output to place the protection switch in a non-conducting state so that power is not delivered to light sources connected to the multiple output channels, wherein the controller circuit provides the output in response to the current sense output.

In a related embodiment, the protection switch may include a transistor having a gate coupled to the controller, a source coupled to at least one resistor, and a drain coupled to each of the voltage converter circuits in the plurality of voltage converter circuits. In a further related embodiment, the drain may be coupled to each of the voltage converter circuits in the plurality of voltage converter circuits through a resistor.

In another embodiment, there is provided a method of protecting against supplying excessive power at one or more output channels of a multiple output channel power supply. The method includes: disabling each voltage converter circuit in a plurality of voltage converter circuits, so that the plurality of voltage converter circuits are not functioning to supply power to one or more light sources connected to the one or more output channels; detecting a current through the plurality of voltage converter circuits after disabling to establish a current sense output; determining that the current sense output exceeds a predetermined level; and in response, decoupling a front end circuit from the plurality of voltage converter circuits.

In a related embodiment, disabling may include placing a switch portion of each of the voltage converter circuits in the plurality of voltage converter circuits in a non-conducting state. In another related embodiment, decoupling may include changing a state of a protection switch coupled between the front end circuit and the plurality of voltage converter circuits.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
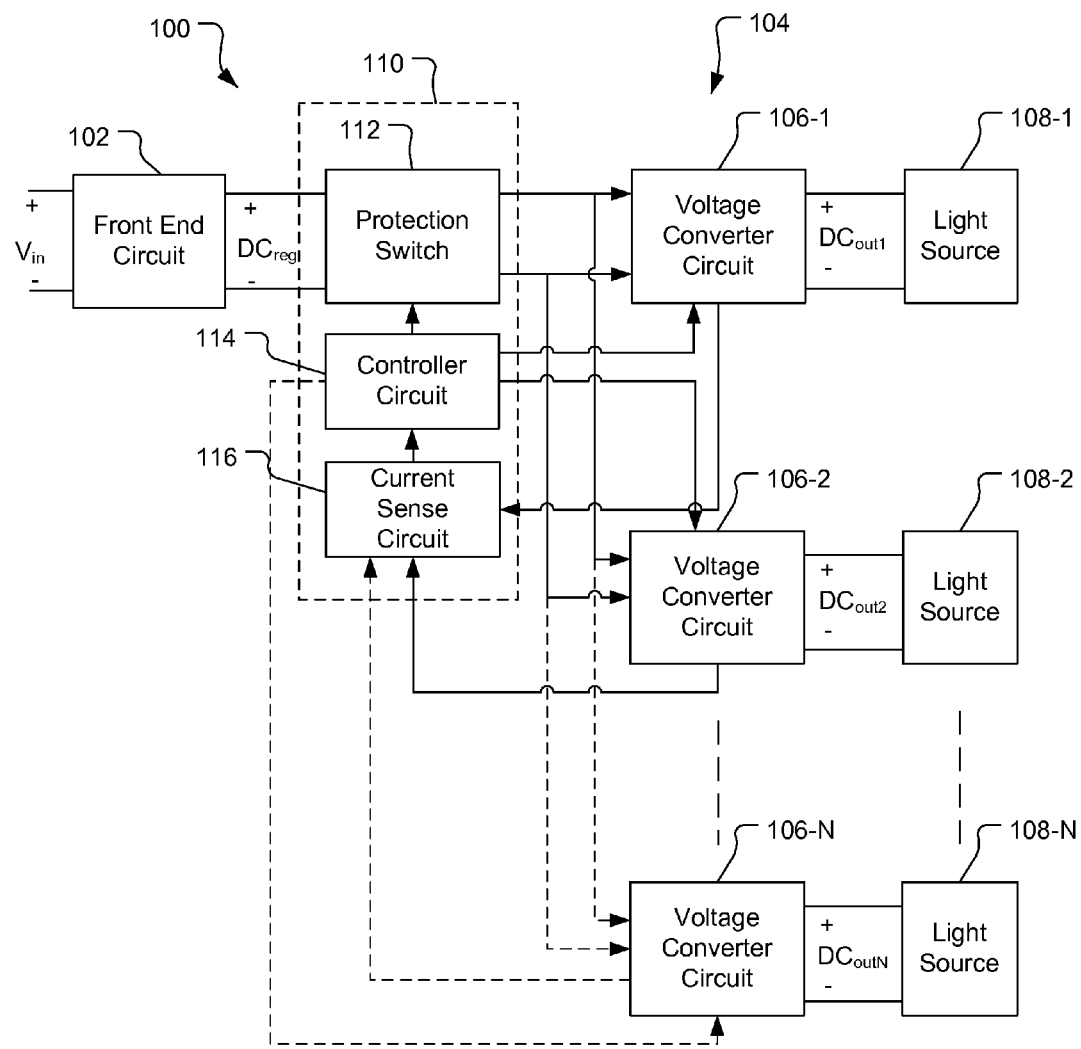
FIG. 1 shows a block diagram of a power supply according to embodiments disclosed herein.

FIG. 1 shows a simplified block diagram of a power supply circuit 100. The power supply circuit 100 includes a known front end circuit 102 and an output stage 104. The output stage 104 includes a plurality of voltage converter circuits 106-1, 106-2, ... 106-N for driving separate associated light sources 108-1, 108-2, ... 108-N, and a protection circuit 110. The protection circuit 110 includes a protection switch 112, a controller circuit 114, and a current sense circuit 116. The front end circuit 102 may include known circuit configurations for receiving an input voltage Vin, either directly or through a known dimmer circuit (not shown), and providing a regulated direct current (DC) output $DC_{reg}$ to the plurality of voltage converter circuits 106-1, 106-2, ... 106-N through the protection circuit 110. In some embodiments, for example, the input voltage $V_{in}$ may be an alternating current (AC) input provided directly from a 120 VAC/60 Hz line source. It is to be understood, however, that a system according to embodiments described herein may operate from a DC source or other AC sources, such as but not limited to a source providing 220-240 VAC at 50-60 Hz.

For example, the front end circuit 102 may incorporate a known rectifier circuit for receiving the input voltage Vin, a known switching converter circuit, and a controller for controlling a switch within the switching converter. A variety of rectifier circuit configurations are well-known in the art. In some embodiments, for example, the rectifier circuit may include a known diode bridge rectifier or H-bridge rectifier. The switching converter circuit may receive the rectified AC output from the rectifier and provide the stable, regulated DC output $DC_{reg}$ to the plurality of voltage converter circuits 106-1, 106-2, . . . 106-N through the protection circuit 110. A variety of switching converter configurations, including, for example, buck converters, boost converters, buck-boost converters, etc., are well-known in the art. These devices generally include a switch, e.g. a transistor, which is selectively operated to allow energy to be stored in an energy storage device, e.g. an inductor, and then transferred to a load, such as a light source, e.g. using one or more filter capacitors. Another known type of switching converter includes a known transformer-based switching converter, such as a "flyback" converter. In a transformer-based switching converter, the primary side of the transformer may be coupled to the rectified AC output of the rectifier. The regulated DC output voltage is provided at the secondary side of the transformer, which is electrically isolated from the primary side of the transformer.

A variety of controllers for controlling the switch of a switching converter are well-known. In embodiments wherein the switching converter configuration is a buck converter, for example, the controller may be a model number TPS40050 controller presently available from Texas Instruments Corporation of Dallas, Tex., USA. The switching converter circuit may also include a known power factor correction (PFC) circuit.

The plurality of voltage converter circuits 106-1, 106-2, . . . 106-N may each include a known switching converter circuit (resulting in a plurality of switching converter circuits). The plurality of switching converter circuits may each include a switch (resulting in a plurality of switches), as described above. The plurality of switching converter circuits may include a known controller for controlling the plurality of switches. The plurality of voltage converter circuits 106-1, 106-2, . . . 106-N may each receive the regulated DC output $DC_{reg}$ of the front end circuit 102 and provide an associated DC output $DC_{out1}$, $DC_{out2}$, . . . $DC_{outN}$ to an associated one of the light sources 108-1, 108-2, . . . 108-N. Each associated DC output $DC_{out1}$, $DC_{out2}$, . . . $DC_{outN}$ of a voltage converter circuit in the plurality of voltage converter circuits 106-1, 106-2, . . . 106-N may be referred to herein as a "channel" or "output" of the power supply circuit 100. The associated light sources 108-1, 108-2, . . . 108-N may include any combination of any type of known light sources, such as but not limited to incandescent lamps, gas-discharge lamps, or solid state light sources. If an associated light source 108-1, 108-2, . . . 108-N is a solid state light source, it may include groups of solid state light sources (e.g., LED(s)) interconnected in series and/or parallel configurations.

Current through each of the voltage converter circuits in the plurality of voltage converter circuits 106-1, 106-2, . . . 106-N may be fed back to the current sense circuit 116, which may provide a current sense output to the controller circuit 114. In some embodiments, the current sense circuit 116 may be configured as one or more resistors (shown in FIGS. 2 and 3), and the current sense output may be a voltage across the resistor(s) that is representative of the current through one or more of the voltage converter circuits in the plurality of voltage converter circuits 106-1, 106-2, . . . 106-N. When the current sense circuit 116 provides a current sense output that exceeds a predefined threshold, the controller circuit 114 provides an output to the protection switch 112 to change the conductive state of the protection switch 112 from a state where the output $DC_{reg}$ of the front end circuit 102 is coupled to the plurality of voltage converter circuits 106-1, 106-2, . . . 106-N (i.e., a conducting state) to a state where the output $DC_{reg}$ of the front end circuit 102 is decoupled from the plurality of voltage converter circuits 106-1, 106-2, . . . 106-N (i.e., a non-conducting state).

The protection switch 112 may be any component or group of components having a conducting or "closed" state and a non-conducting or "open" state. In some embodiments, for example, the protection switch 112 may include a transistor. When the protection switch 112 is in a conducting or "closed" state, the output $DC_{reg}$ of the front end circuit 102 is coupled to the plurality of voltage converter circuits 106-1, 106-2, . . . 106-N, and when the protection switch is in a non-conducting or "open" state, the output $DC_{reg}$ of the front end circuit 102 is decoupled from the plurality of voltage converter circuits 106-1, 106-2, . . . 106-N. The controller circuit 114 may be any type of circuit configured to provide an output for changing the state of the protection switch 112 in response to the current sense output of the current sense circuit 116. For example, the controller circuit 114 may be a microcontroller configured to change the conduction state of the protection switch 112 when the current sense output exceeds a predetermined threshold.

In embodiments wherein the plurality of voltage converter circuits 106-1, 106-2, . . . 106-N are configured as a plurality of switching converters including a plurality of switches, the controller circuit 112 may also be configured to provide an output to each of the voltage converter circuits in the plurality of voltage converter circuits 106-1, 106-2, . . . 106-N for placing the plurality of switches within the plurality of voltage converter circuits 106-1, 106-2, . . . 106-N in a non-conducting or "open" state whereby, assuming there is no fault in the plurality of voltage converter switches 106-1, 106-2, . . . 106-N, no power is provided to the associated light sources 108-1, 108-2, . . . 108-N at the output of the plurality of voltage converter circuits 106-1, 106-2, . . . 106-N. For example, the controller circuit 114 may be configured to disable the gate drive of a transistor switch of a switching converter in the plurality of switching converters, to thereby turn the switching converter off, so that no power is supplied to the associated light source by the transistor switch.

With this configuration, when the controller circuit 114 turns the voltage converter circuits 106-1, 106-2, . . . 106-N "off" (i.e., in a non-conducting/"open" state), there should be little or no current through the plurality of switches in the plurality of switching converters, and the current sense output of the current sense circuit 116 should be below the predetermined threshold for causing a change in the conduction state of the protection switch 112. However, in the event of, for example, a short occurring in a switch in the plurality of voltage converter circuits 106-1, 106-2, . . . 106-N, e.g. across a transistor switch thereof, the current sense circuit 116 will provide a current sense output to the controller circuit 114 that is above the pre-determined threshold. In response, the controller circuit 114 will change the conduction state of the protection switch 112 to decouple the regulated DC output $DC_{reg}$ of the front end circuit 102 from the plurality of voltage converter circuits 106-1, 106-2, . . . 106-N. Accordingly, in the power supply circuit 100, the protection circuit 110 acts to protect against a fault in the plurality of voltage converter circuits 106-1, 106-2, . . . 106-N that would potentially result in excessive power being supplied to one or more of the associated light sources 108-1, 108-2, . . . 108-N. In some embodiments, for example, the component values of the current sense circuit 116 and the predetermined threshold set in the controller circuit 114 may be established to decouple the front end circuit 102 from the plurality of voltage converter circuits 106-1, 106-2, ... 106-N before a fault in one of the plurality of voltage converter circuits 106-1, 106-2, ... 106-N causes the power provided to an associated channel of the power supply circuit 100 to exceed 100 W, thereby providing compliance with the UL1310 class 2 standard.

Figure 2:
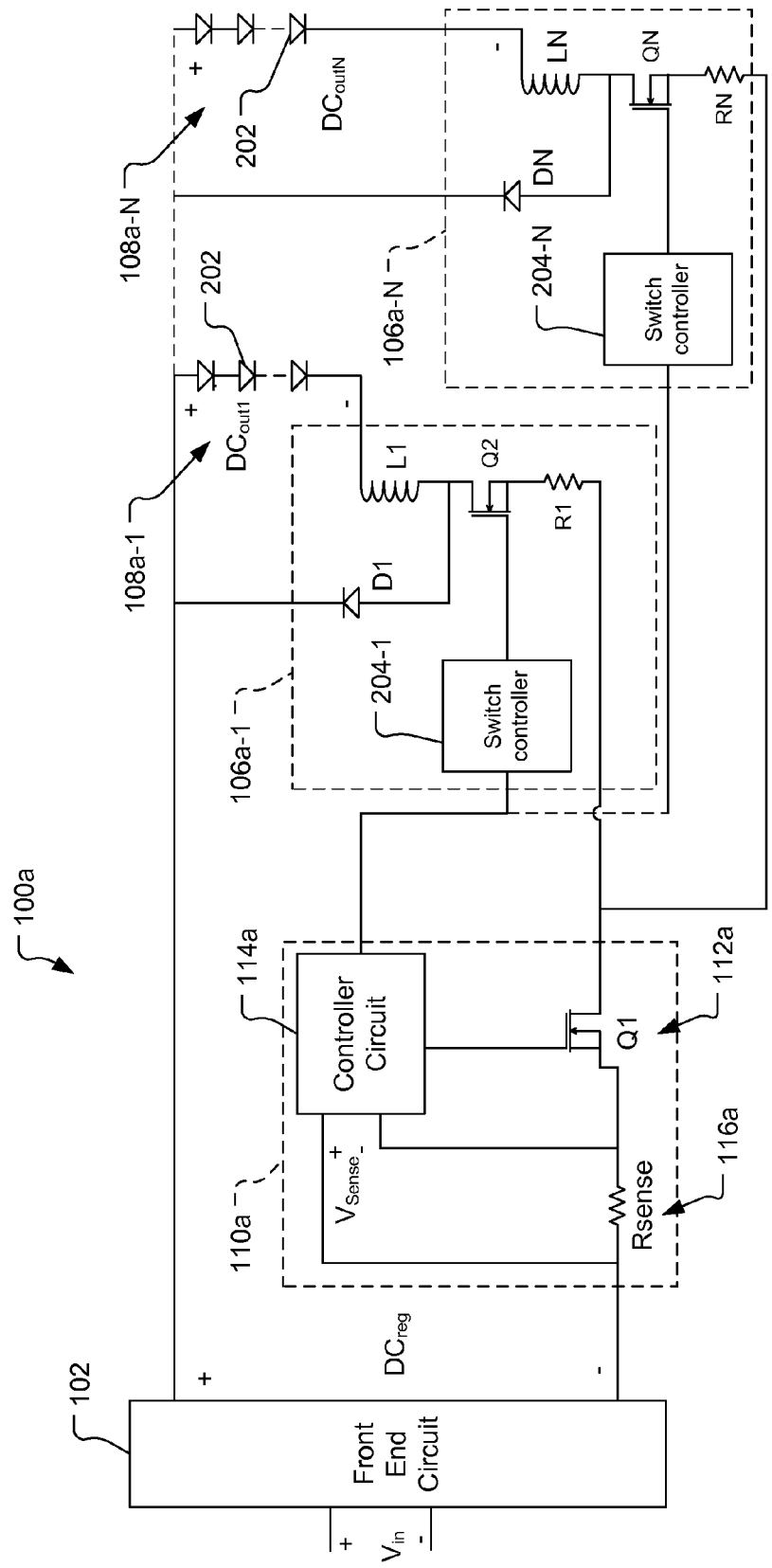
FIG. 2 is a circuit diagram of a power supply according to embodiments disclosed herein.

A power supply (also referred to throughout as a "power supply circuit") according to embodiments described herein may be provided in a variety of configurations. FIG. 2 illustrates a power supply circuit 100a, including a front end circuit 102, a protection circuit 110a, and an output stage including a plurality of voltage converter circuits 106a-1 ... 106a-N, each of which is configured to provide an associated output/channel for driving an associated light source 108a-1 ... 108a-N. In FIG. 2, the associated light sources 108a-1 ... 108a-N are configured as a plurality of series connected light emitting diodes 202. It is to be understood, however, that separate outputs/channels for driving any type of light source and/or different types of light sources on each channel may be used without departing from the scope of the invention. In embodiments where solid state light sources are among the associated light sources 108a-1 ... 108a-N, each of the solid state light sources may include any number of solid state light sources coupled in series, parallel, parallel combinations of series solid state light sources, or a single solid state light source. The operating characteristics and number of solid state light sources coupled to one of the outputs/channels of a power supply circuit according to embodiments described throughout may be different from the operating characteristics and number of solid state light sources coupled to another one of the outputs/channels.

In FIG. 2, the plurality of voltage converter circuits 106a-1 ... 106a-N are provided in a known buck converter configuration. The voltage converter circuit 106a-1, for example, includes a metal-oxide field effect transistor (MOSFET) Q2 that acts as a switch, a switch controller 204-1, a resistor R1, a diode D1, and an inductor L1. The source of the MOSFET Q2 is coupled to the low side of the output $DC_{reg}$ from the front end circuit 102 through the resistor R1 and the protection circuit 110a, and the drain of the MOSFET Q2 is coupled to the high side of the output $DC_{reg}$ from the front end circuit 102 through the inductor L1 and the associated light source 108a-1. The diode D1 is coupled from the drain of the MOSFET Q2 to the high side of the output $DC_{reg}$ from the front end circuit 102, and is reverse biased relative to the high side of the output $DC_{reg}$ from the front end circuit 102. The switch controller 204-1 is coupled to the gate of the MOSFET Q2 for providing a pulse-width modulated (PWM) gate drive signal to open and close the MOSFET Q2 in a known manner. In some embodiments, for example, the switch controller 204-1 may be a model number TPS40050 controller presently available from Texas Instruments Corporation of Dallas, Tex., USA.

Each of the voltage converter circuits in the plurality of voltage converter circuits 106a-1 ... 106a-N shown in FIG. 2 may have the same buck converter configuration. The voltage converter 106a-N, for example, includes a metal-oxide field effect transistor (MOSFET) QN which acts as a switch, a switch controller 204-N, a resistor RN, a diode DN, and an inductor LN. The source of the MOSFET QN is coupled to the low side of the output $DC_{reg}$ from the front end circuit 102 through the resistor RN and the protection circuit 110a, and the drain of the MOSFET QN is coupled to the high side of the output $DC_{reg}$ from the front end circuit 102 through the inductor LN and the associated light source 108a-N. The diode DN is coupled from the drain of the MOSFET QN to the high side of the output $DC_{reg}$ from the front end circuit 102, and is reverse biased relative to the high side of the output $DC_{reg}$ from the front end circuit 102. The switch controller 204-N is coupled to the gate of the MOSFET QN for providing a PWM gate drive signal to open and close the MOSFET QN in a known manner.

The protection circuit 110a includes a protection switch 112a, a current sense circuit 116a, and a controller circuit 114a. In FIG. 2, the protection switch 112a is configured as a MOSFET Q1, where the source of the MOSFET Q1 is coupled to the low side of the output $DC_{reg}$ of the front end circuit 102 through the current sense circuit 116a, which is configured as a resistor Rsense. The drain of the MOSFET Q1 is coupled to the source of each of the switches in the plurality of switches Q2 ... QN in the plurality of voltage converter circuits 106a-1 ... 106a-N through the resistors R1 ... RN, respectively. With this configuration, the plurality of voltage converter circuits 106a-1 ... 106a-N, particularly the plurality of switches Q1 ... QN, are coupled to the low side of the output $DC_{reg}$ of the front end circuit 102 through the protection switch 112a and the current sense circuit 116a. Thus, when the protection switch 112a is in a conducting or "closed" (i.e., "on") state, the low side of the output $DC_{reg}$ of the front end circuit 102 is coupled to the plurality of voltage converter circuits 106a-1 ... 106a-N, but when the protection switch 112a is in a non-conducting or "open" (i.e., "off") state, the low side of the output $DC_{reg}$ of the front end circuit 102 is decoupled from the plurality of voltage converter circuits 106a-1 ... 106a-N, thereby disabling the supply of power to the outputs/channels of the power supply circuit 100a.

The gate of the MOSFET Q1 is coupled to the controller circuit 114a, and voltage $V_{Sense}$ across the resistor Rsense is provided as an input to the controller circuit 114a. When the current through the resistor Rsense, and hence the voltage $V_{Sense}$, provided as an input to the controller circuit 114a exceeds a predetermined level, there may be a short or fault in one or more of the plurality of voltage converter circuits 106a-1 ... 106a-N. For example, there may be a short across the switch Q2 or the switch QN, leading to a potential for excess power delivered at the associated output/channel of the power supply circuit 100a. In response to the voltage $V_{Sense}$ exceeding the predetermined level, therefore, the controller circuit 114a is configured to provide an output to the gate of the MOSFET Q1 to place the MOSEFT Q1 in a non-conducting or "open" state, thereby decoupling the output $DC_{reg}$ from the front end circuit 102 from the plurality of voltage converter circuits 106a-1 ... 106a-N and disabling supply of power to all the outputs/channels of the power supply circuit 100a.

In FIG. 2, the controller circuit 114a is configured to provide an output to each of the switch controllers 204-1 ... 204-N in the plurality of voltage converter circuits 106a-1 ... 106a-N to enable and disable the PWM gate drive output of the switch controllers 204-1 ... 204-N to the plurality of switches Q2 ... QN. When the switch controllers 204-1 ... 204-N are enabled by the output of the controller circuit 114a, the PWM gate drive signals of the switch controllers 204-1 ... 204-N drive the gates of the plurality of switches Q2 ... QN to place the plurality of switches Q2 ... QN in alternately conducting ("closed") and non-conducing ("open") states to deliver power to the associated light sources 108a-1 ... 108a-N coupled thereto. When the switch controllers 204-1 ... 204-N are disabled by the output of the controller circuit 114a, the switch controllers 204-1 ... 204-N place the plurality of switches Q2 . . . QN in a non-conducting ("open") state thereby disabling power delivery to the associated light sources 108a-1 . . . 108a-N when the switches are functioning properly.

Faults or shorts in the plurality of voltage converter circuits 106a-1 . . . 106a-N that would potentially cause excessive power delivery to the outputs/channels of the power supply circuit 100a may be detected by providing an output from the controller circuit 114a to the switch controllers 204-1 . . . 204-N to place the plurality of switches Q2 . . . QN in an non-conducting ("open") state and disable power delivery to the light sources. When the plurality of switches Q2 . . . QN are placed in a non-conducing state, and Q1 is in a conducting ("closed") state, there should be very little current through the resistor Rsense if there is no fault in the plurality of switches Q2 . . . QN. In such situations, the voltage $V_{Sense}$ would not exceed the predetermined value set in the controller circuit 114a, and the controller circuit 114a would continue to provide an output to the gate of the MOSFET Q1 to keep the MOSFET Q1 in a conducing ("closed") state for coupling the output $DC_{reg}$ of the front end circuit 102 to the plurality of voltage converter circuits 106a-1 . . . 106a-N. The controller circuit 114a may then provide an output to the switch controllers 204-1 . . . 204-N to enable the gate drive output to the plurality of switches Q2 . . . QN to resume normal operation and delivery of power to the associated light sources 108a-1 . . . 108a-N.

However, in the event of a fault in one or more of the plurality of voltage converter circuits 106a-1 . . . 106a-N, such as a short across one or more of the switches in the plurality of switches Q2 . . . QN, when the plurality of switches Q2 . . . QN are placed in a non-conducing ("open") state, current may pass through the short, through the MOSFET Q1 and through the resistor Rsense. This may cause a voltage $V_{Sense}$ that exceeds the predetermined value set in the controller circuit 114a. In response, the controller circuit 114a may provide an output to the gate of the MOSFET Q1 to place the MOSFET Q1 in a non-conducting state to decouple the output $DC_{reg}$ of the front end circuit 102 from the plurality of voltage converter circuits 106a-1 . . . 106a-N to thereby cease delivery of power to the output channels.

Figure 3:
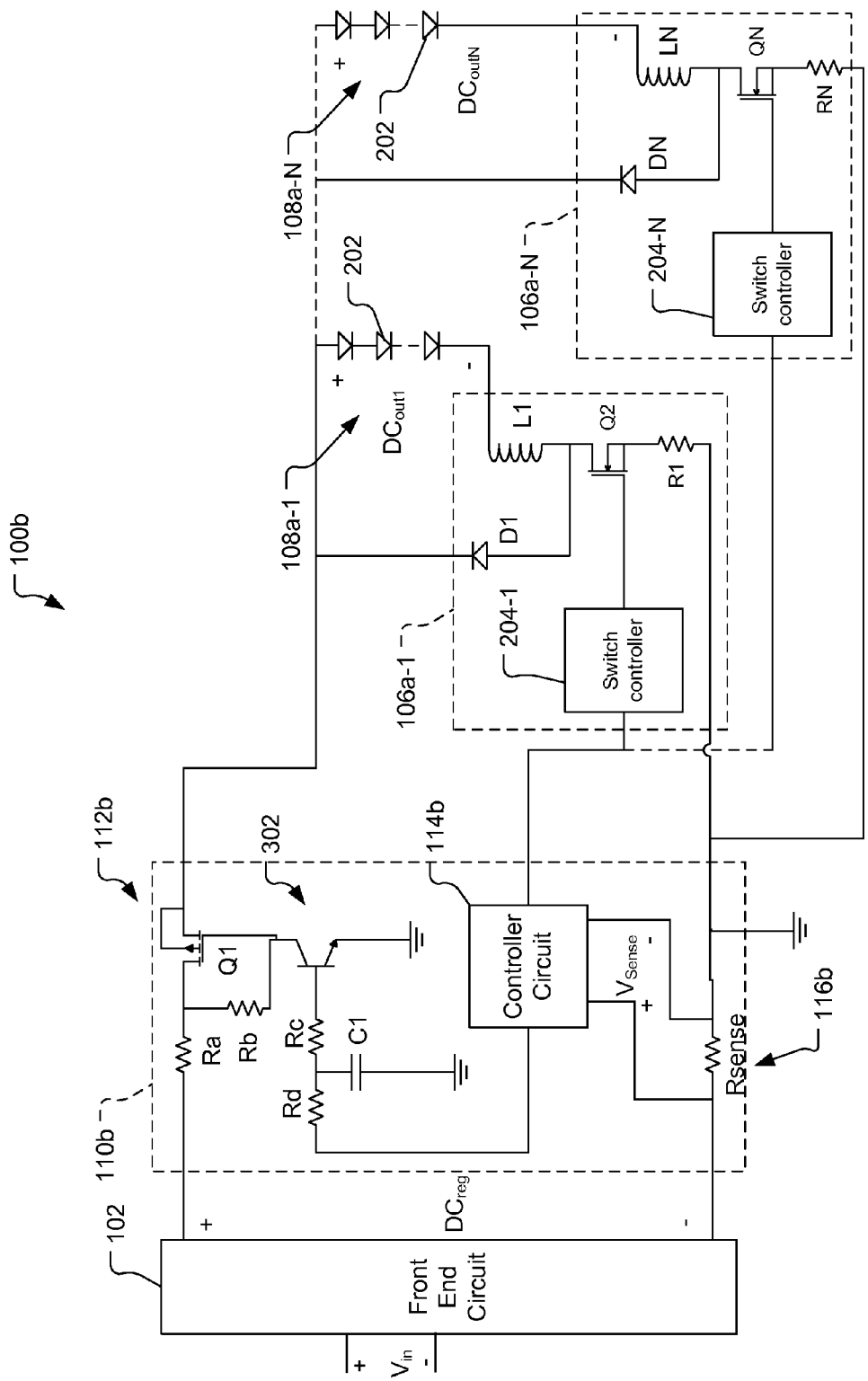
FIG. 3 is another circuit diagram of a power supply according to embodiments disclosed herein.

Another configuration of a power supply circuit 100b is illustrated in FIG. 3. The power supply circuit 100b includes a front end circuit 102, a protection circuit 110b, and an output stage including a plurality of voltage converter circuits 106a-1 . . . 106a-N, each of which is configured to provide an associated output/channel for driving an associated light source 108a-1 . . . 108a-N. The front end circuit 102, the plurality of voltage converter circuits 106a-1 . . . 106a-N, and the associated light sources 108a-1 . . . 108a-N shown in FIG. 3 are the same as those shown and described in connection with the power supply circuit 100a shown in FIG. 2. For simplicity, the description of the front end circuit 102, the plurality of voltage converter circuits 106a-1 . . . 106a-N, and the associated light sources 108a-1 . . . 108a-N will not be repeated in connection with the power supply circuit 100b of FIG. 3.

The protection circuit 110b of FIG. 3 includes a protection switch 112b, a current sense circuit 116b, and a controller circuit 114b. The current sense circuit 116b is configured as a resistor Rsense through which the low side of the output $DC_{reg}$ of the front end circuit 102 is coupled to ground. The sources of the plurality of switches Q2 . . . QN are coupled to ground through the resistors R1 . . . RN, respectively.

The protection switch 112b is configured as a MOSFET Q1 and a drain of the MOSFET Q1 is coupled to the high side of the output $DC_{reg}$ of the front end circuit 102 through a resistor Ra. A source of the MOSFET Q1 is coupled to the drain of each of the switches in the plurality of switches Q2 . . . QN in the plurality of voltage converter circuits 106a-1 . . . 106a-N through the associated light sources 108a-1 . . . 108a-N and the inductors L1 . . . LN, respectively, and also through the reverse biased diodes D1 . . . DN. With this configuration, the plurality of voltage converter circuits 106a-1 . . . 106a-N, particularly the plurality of switches Q2 . . . QN, are coupled to the high side of the output $DC_{reg}$ of the front end circuit 102 through the protection switch 112b and the resistor Ra. Thus, when the protection switch 112b is in a conducting or "closed" state, the high side of the output $DC_{reg}$ of the front end circuit 102 is coupled to the plurality of voltage converter circuits 106a-1 . . . 106a-N, but when the protection switch 112b is in a non-conducting or "open" state, the high side of the output $DC_{reg}$ of the front end circuit 102 is decoupled from the plurality of voltage converter circuits 106a-1 . . . 106a-N, thereby disabling the supply of power to the outputs/channels of the power supply circuit 100b.

A gate of the MOSFET Q1 is coupled to a collector of a bipolar junction transistor (BJT) 302 and also to the drain of the MOSFET Q1 through a resistor Rb. An emitter of the BJT 302 is coupled to ground. A base of the BJT 302 is coupled to an output of the controller circuit 114b through resistors Rc and Rd, and a junction between the resistors Rc and Rd is coupled to ground through a filter capacitor C1. When the current through the resistor Rsense (i.e., the current sense circuit 116b), and hence the voltage $V_{Sense}$, provided to an input of the controller circuit 114b exceeds a predetermined level, there may be a short or fault in one or more of the plurality of voltage converter circuits 106a-1 . . . 106a-N. In response to the voltage $V_{Sense}$ exceeding the predetermined level, therefore, the controller circuit 114b is configured to provide an output to a gate of the BJT 302 through the resistors Rd and Rc to place the BJT 302 in a conducting state. When the BJT 302 is in a conducing state, the MOSFET Q1 is placed in a non-conducting or "open" state, thereby decoupling the output $DC_{reg}$ from the front end circuit 102 from the plurality of voltage converter circuits 106a-1 . . . 106a-N, and disabling supply of power to all the outputs/channels of the power supply circuit 100b.

The controller circuit 114b is configured to provide an output to each of the switch controllers 204-1 . . . 204-N to enable and disable the PWM gate drive output of the switch controllers 204-1 . . . 204-N to the plurality of switches Q2 . . . QN. When the switch controllers 204-1 . . . 204-N are enabled by the output of the controller circuit 114b, the PWM gate drive signals of the switch controllers 204-1 . . . 204-N drive the gates of the plurality of switches Q2 . . . QN to place the plurality of switches Q2 . . . QN in alternately conducting ("closed") and non-conducing ("open") states to deliver power to the associated light sources 108a-1 . . . 108a-N coupled thereto. When the switch controllers 204-1 . . . 204-N are disabled by the output of the controller circuit 114b, the switch controllers 204-1 . . . 204-N place the plurality of switches Q2 . . . QN in a non-conducting ("open") state, thereby disabling power delivery to the associated light sources 108a-1 . . . 108a-N when the switches are functioning properly.

Faults or shorts in the plurality of voltage converter circuits 106a-1 . . . 106a-N that would potentially cause excessive power delivery to the outputs/channels of the power supply circuit 100b may be detected by providing an output from the controller circuit 114b to the switch controllers 204-1 . . . 204-N to place the plurality of switches Q2 . . . QN in an non-conducting ("open") state and disable power delivery to the associated light sources 108a-1 . . . 108a-N. When the plurality of switches Q2 ... QN are placed in a non-conducing state, and the MOSFET Q1 is in a conducting ("closed") state, the current through the resistor Rsense should be relatively low. In this case, the voltage $V_{Sense}$ would not exceed the predetermined value set in the controller circuit 114b, and the controller circuit 114b would continue to provide an output to the BJT 302 to keep the MOSFET Q1 in a conducing state for coupling the output $DC_{reg}$ of the front end circuit 102 to the plurality of voltage converter circuits 106a-1 ... 106a-N. The controller circuit 114b may then provide an output to the switch controllers 204-1 ... 204-N to enable the gate drive output to the plurality of switches Q2 ... QN to resume normal operation and delivery of power to the associated light sources 108a-1 ... 108a-N.

However, in the event of a fault in one or more of the plurality of voltage converter circuits 106a-1 ... 106a-N, when the plurality of switches Q2 ... QN are placed in a non-conducting state, a current through the resistor Rsense may increase compared to when no fault exists. This may cause a voltage $V_{Sense}$ that exceeds the predetermined value set in the controller circuit 114b. In response, the controller circuit 114b may provide an output to the BJT 302 to place the MOSFET Q1 in a non-conducing state to decouple the output $DC_{reg}$ of the front end circuit 102 from the plurality of voltage converter circuits 106a-1 ... 106a-N, to thereby cease delivery of power to the output channels.

Figure 4:
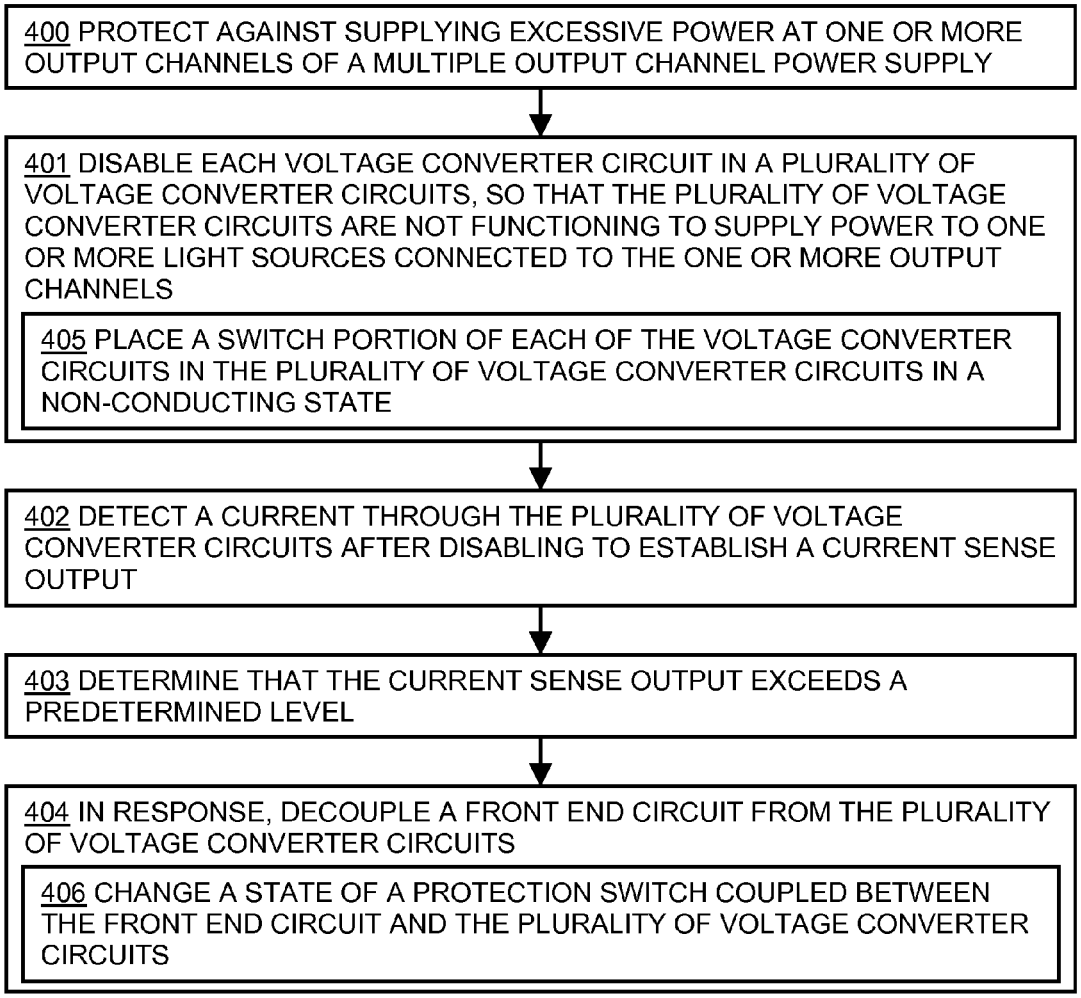
FIG. 4 is a block flow diagram of a method according to embodiments disclosed herein.

FIG. 4 is a block flow diagram of a method 400 and 600 of protecting against supplying excessive power at one or more output channels of a multiple output channel power supply, such as the power supply circuits 100, 100a, and 100b shown in FIGS. 1, 2, and 3, according to embodiments described herein. The illustrated block flow diagram may be shown and described as including a particular sequence of steps. It is to be understood, however, that the sequence of steps merely provides an example of how the general functionality described herein can be implemented. The steps do not have to be executed in the order presented unless otherwise indicated.

In the method 400, each voltage converter circuit in a plurality of voltage converter circuits is disabled, step 401, so that the plurality of voltage converter circuits are not functioning to supply power to one or more light sources connected to the one or more output channels of the power supply. A current is detected through the plurality of voltage converter circuits after disabling to establish a current sense output, step 402. It is determined whether or not the current sense output exceeds a predetermined level, step 403, and if so, in response, a front end circuit is decoupled from the plurality of voltage converter circuits, step 404. In some embodiments, disabling includes placing a switch portion of each of the voltage converter circuits in the plurality of voltage converter circuits in a non-conducting state, step 405. In some embodiments, decoupling includes changing a state of a protection switch coupled between the front end circuit and the plurality of voltage converter circuits, step 406.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A light source power supply circuit having multiple output channels, comprising:
    a front end circuit configured to receive an input voltage and provide a regulated front end direct current (DC) voltage;
    a plurality of voltage converter circuits, each of the voltage converter circuits in the plurality of voltage converter circuits being configured to receive the regulated front end DC voltage and provide a separate associated DC output for an associated one of the multiple output channels;
    a protection switch coupled between the plurality of voltage converter circuits and the front end circuit, the protection switch having a conducting state to couple the front end DC voltage to the plurality of voltage converter circuits and a non-conducting state to decouple the front end DC voltage from the plurality of voltage converter circuits;
    a current sense circuit coupled to the plurality of voltage converter circuits, the current sense circuit being configured to provide a current sense output representative of current through at least one of the voltage converter circuits in the plurality of voltage converter circuits; and
    a controller circuit configured to place the protection switch in the non-conducting state in response to the current sense output.

2. The light source power supply circuit of claim 1, wherein the plurality of voltage converter circuits comprises a plurality of switches, and wherein the controller circuit is configured to provide an output to place a switch in the plurality of switches in a non-conducting state so that power is not delivered by the switch in the plurality of switches to a light source connected to an output channel of the light source power supply circuit associated with that switch.

3. The light source power supply circuit of claim 1, wherein the protection switch is coupled between a low side output of the front end circuit and the plurality of voltage converter circuits.

4. The light source power supply circuit of claim 3, wherein the plurality of voltage converter circuits is a plurality of switching converter circuits, and wherein the current sense circuit comprises at least one resistor, the at least one resistor being coupled to each of the switching converter circuits in the plurality of switching converter circuits to sense current through the plurality of switching converter circuits, and wherein the current sense output comprises a voltage across the at least one resistor.

5. The light source power supply circuit of claim 4, wherein the protection switch comprises a transistor having a gate coupled to the controller, a source coupled to the at least one resistor, and a drain coupled to each of the switching converter circuits in the plurality of switching converter circuits.

6. The light source power supply circuit of claim 5, wherein the drain is coupled to a switch portion of each switching converter circuit in the plurality of switching converter circuits through a resistor.

7. The light source power supply circuit of claim 1, wherein the protection switch is coupled between a high side output of the front end circuit and the plurality of voltage converter circuits.

8. The light source power supply circuit of claim 7, wherein the current sense circuit comprises at least one resistor coupled between a low side output of the front end circuit and ground, and wherein the current sense output comprises a voltage across the at least one resistor.

9. The light source power supply circuit of claim 1, wherein each of the voltage converter circuits in the plurality of voltage converter circuits is configured as a buck converter.

10. A multiple output channel light source power supply circuit, comprising:
    a front end circuit configured to receive an input voltage and provide a regulated front end direct current (DC) voltage;
    a plurality of voltage converter circuits, each of the voltage converter circuits being configured as a buck converter and configured to receive the regulated front end DC voltage and provide a separate associated DC output for an associated one of the multiple output channels;
    a protection switch coupled between the plurality of voltage converter circuits and a low side output of the front end circuit, the protection switch having a conducting state to couple the front end DC voltage to the plurality of voltage converter circuits and a non-conducting state to decouple the front end DC voltage from the plurality of voltage converter circuits;
    a current sense circuit coupled to the plurality of voltage converter circuits, the current sense circuit configured to provide a current sense output representative of current through at least one of the voltage converter circuits; and
    a controller circuit configured to provide an output to place the protection switch in a non-conducing state so that power is not delivered to light sources connected to the multiple output channels, wherein the controller circuit provides the output in response to the current sense output.

11. The multiple output channel light source power supply circuit of claim 10, wherein the protection switch comprises a transistor having a gate coupled to the controller, a source coupled to at least one resistor, and a drain coupled to each of the voltage converter circuits in the plurality of voltage converter circuits.

12. The multiple output channel light source power supply circuit of claim 11, wherein the drain is coupled to each of the voltage converter circuits in the plurality of voltage converter circuits through a resistor.

\* \* \* \* \*